April 10, 1928.
J. M. WEED
ELECTRIC WELDING
Filed May 18, 1925
1,665,869
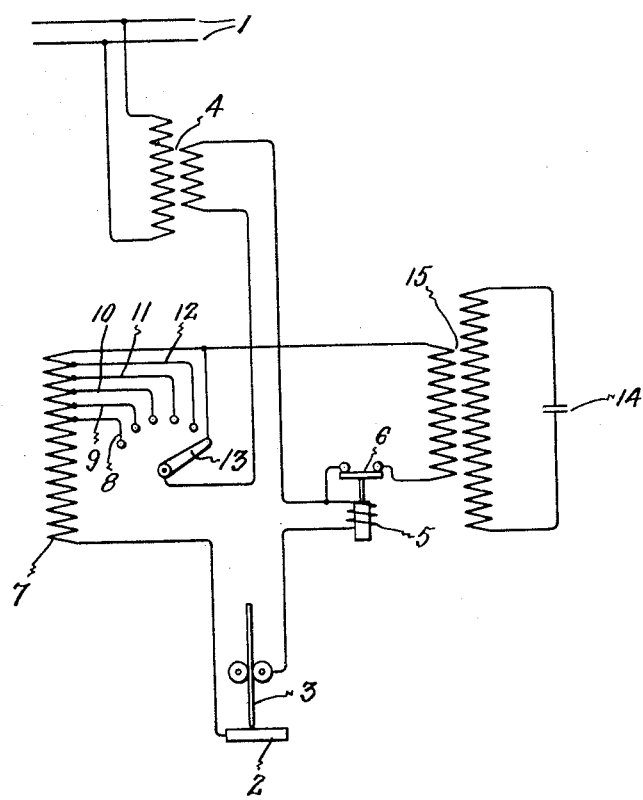
Inventor:
James M. Weed,
by *Alexander S. Smith*
His Attorney.

Patented Apr. 10, 1928.

1,665,869

UNITED STATES PATENT OFFICE.

JAMES M. WEED, OF SCOTIA, NEW YORK, ASSIGNOR TO GENERAL ELECTRIC COMPANY, A CORPORATION OF NEW YORK.

ELECTRIC WELDING.

Application filed May 18, 1925. Serial No. 30,933.

My invention relates primarily to electric welding, and has for its principal object the provision of an improved arc welding system which operates with a high degree of efficiency and is susceptible of being controlled in a simple manner.

In the operation of an arc welding system, it is desirable that means be provided for stabilizing the arc and for adjusting the current to different values. This is ordinarily accomplished by an adjustable inductance. The use of inductance in series with the arc naturally results in a low power factor load. In accordance with my invention a circuit containing capacitance is associated with the welding circuit for improving the power factor at which welding current is utilized, means for controlling the system are arranged to produce simultaneous and proportionate changes in the volt amperes of the capacitance and welding circuits; and means are provided for interrupting the capacitance circuit upon the interruption of the current supplied to the arc.

My invention will be better understood from the following description when considered in connection with the accompanying drawing and its scope will be pointed out in the appended claims.

The drawing shows a system wherein my invention has been embodied.

This system comprises leads 1 for supplying current to an electric arc between the work 2 and electrode 3 through a circuit comprising the secondary winding of transformer 4, operating coil 5 of contactor 6 and an adjustable reactance device 7 provided with taps 8 to 12 and a contact member 13 adapted to cooperate with the contacts of these taps. A condenser 14 is arranged to be connected to the welding circuit through contactor 6, an adjustable portion of the reactance device 7 and a step-up transformer 15 provided for raising the voltage applied to the condenser terminals.

In the illustrated position of the contact arm 13, the reactance device 7 serves merely as a reactor in series with the arc and only the secondary voltage of the main transformer 4 is impressed on the primary circuit of the condenser transformer 15. Movement of the contact member 13 into the engagement with the contact of tap 12, however, causes the reactance device 7 also to function as an auto-transformer, as regards voltage relationships by which an additional voltage, increasing as the contact member is moved toward the tap 8, is applied to the circuit comprising the primary winding of transformer 15, switch 6 and the secondary winding of transformer 4. The voltage applied to transformer 15 with this connection thus comprises two components one of which is applied from the transformer 4 and is substantially constant and the other of which is applied through the device 7 and varies in a manner to maintain a proportionate relation between the kilovolt amperes of the welding and condenser circuits. This method of operation is of advantage in that each adjustment of the welding current to a different value is accompanied by a corresponding change in the condenser current and great fluctuations in the power factor of the system are prevented.

This holds true even in case of entire interruptions and resumptions of current since if, for any reason, the current through the arc becomes interrupted, the contactor 6 opens, thus interrupting the condenser current also, while a resumption of the arc current causes the contactor to close again causing the resumption of the condenser current.

The arrangement described has the further advantage that the reactance device 7, the condenser 14 and the transformer 15 may be assembled together independently of the main transformer 4 at a point near the welding apparatus thus ensuring that current is transmitted to the immediate vicinity of the welding set at a high power factor.

The embodiment of the invention illustrated and described herein has been selected for the purpose of clearly setting forth the principles involved. It will be apparent, however, that the invention is susceptible of being modified to meet the different conditions encountered in its use. It is recognized, moreover, that it is applicable to other than arc welding circuits, wherever inductance is used as a means of controlling the current, as for instance arc furnace circuits. I therefore aim to cover by the appended claims all modifications within the true spirit and scope of my invention.

What I claim as new and desire to secure by Letters Patent of the United States, is,—

1. The combination of an alternating current welding circuit, an adjustable reactance device connected to said circuit, an adjustable capacitance device connected to said circuit, and means electrically interconnecting said devices for simultaneously producing substantially proportionate adjustments in the volt amperes of said circuit and said capacitance device.

2. The combination of a welding circuit, a capacitance device connected to said circuit, an adjustable reactance device interconnected with said circuit and capacitance device to produce proportionate adjustments in the volt amperes of said circuit and said capacitance device, and means for interrupting the circuit of said capacitance device when the current transmitted through said welding circuit decreases below a predetermined value.

3. The combination of a load circuit, a capacitance device connected to said load circuit, an adjustable reactance device connected to said circuit and means electrically interconnecting said devices for simultaneously adjusting said devices to produce proportionate adjustments in the volt amperes of said load circuit and said capacitance device.

4. An electric arc welding system comprising a welding circuit, a reactance device connected in series with said circuit for adjusting the current thereof to different values, a condenser connected to said circuit and said reactance device for improving the power factor at which current is supplied thereto, and means for adjusting the connection of said condenser to said reactance device in a manner to produce simultaneous changes in the volt amperes of said condenser and said circuit.

5. An electric arc welding system comprising a welding circuit, a reactance device provided with taps and connected in series with said circuit for adjusting the current thereof to different values, a condenser arranged to be connected in shunt to said circuit through an adjustable portion of said reactance device, and means arranged to co-operate with the taps of said reactance device for producing simultaneous changes in the current transmitted through said circuit and the voltage applied to said condenser.

6. An electric system comprising a load circuit, a reactance device provided with taps and connected in series with said load circuit for adjusting the current thereof to different values, a condenser arranged to be connected in shunt to said load circuit through an adjustable portion of said reactance device, and means arranged to cooperate with the taps of said reactance device for producing simultaneous changes in the current transmitted through said load circuit and the voltage applied to the condenser.

In witness whereof, I have hereunto set my hand this 16th day of May, 1925.

JAMES M. WEED.